(12) United States Patent
Suzuki et al.

(10) Patent No.: US 8,345,937 B2
(45) Date of Patent: Jan. 1, 2013

(54) IMAGE PROCESSING APPARATUS AND CONTROL METHOD FOR SAME

(75) Inventors: Takashi Suzuki, Kawasaki (JP); Yuji Kaneda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 974 days.

(21) Appl. No.: 12/033,546

(22) Filed: Feb. 19, 2008

(65) Prior Publication Data

US 2008/0285791 A1 Nov. 20, 2008

(30) Foreign Application Priority Data

Feb. 20, 2007 (JP) ................. 2007-039823

(51) Int. Cl.
*G06K 9/00* (2006.01)
(52) U.S. Cl. ...................................... 382/118
(58) Field of Classification Search .......... 382/117–118, 382/209, 218, 224
See application file for complete search history.

(56) References Cited

U.S. PATENT DOCUMENTS

| 6,525,663 | B2 * | 2/2003 | Colmenarez et al. ...... 340/573.1 |
| 7,409,091 | B2 * | 8/2008 | Sung et al. .................. 382/191 |
| 7,502,494 | B2 * | 3/2009 | Tafuku et al. ............... 382/118 |
| 7,620,242 | B2 * | 11/2009 | Enomoto et al. ............ 382/167 |
| 2007/0139512 | A1 * | 6/2007 | Hada et al. ................. 348/14.01 |
| 2007/0195174 | A1 * | 8/2007 | Oren ........................... 348/222.1 |
| 2007/0242861 | A1 * | 10/2007 | Misawa et al. .............. 382/118 |

FOREIGN PATENT DOCUMENTS

| EP | 1648166 A2 * | 4/2006 |
| JP | 2004-294498 A | 10/2004 |
| JP | 2005-056388 A | 3/2005 |

OTHER PUBLICATIONS

M. Matsugu, K. Mori, et. al, "Convolutional Spiking Neural Network Model for Robust Face Detection," 2002, International Conference on Neural Information Processing (ICONIP02).

* cited by examiner

*Primary Examiner* — Daniel Mariam
(74) *Attorney, Agent, or Firm* — Canon USA Inc IP Division

(57) ABSTRACT

A person is detected as a subject from an image obtained by image capture, and information, for example, the number of such subjects, is obtained as subject-related information. Then, the greater the number of subjects, the more a setting of a condition that the subjects should satisfy is relaxed. As a result, in an image processing apparatus having a function that identifies a subject state, the usability of that function that identifies the subjects can be improved even in a case in which multiple subjects are present.

10 Claims, 16 Drawing Sheets

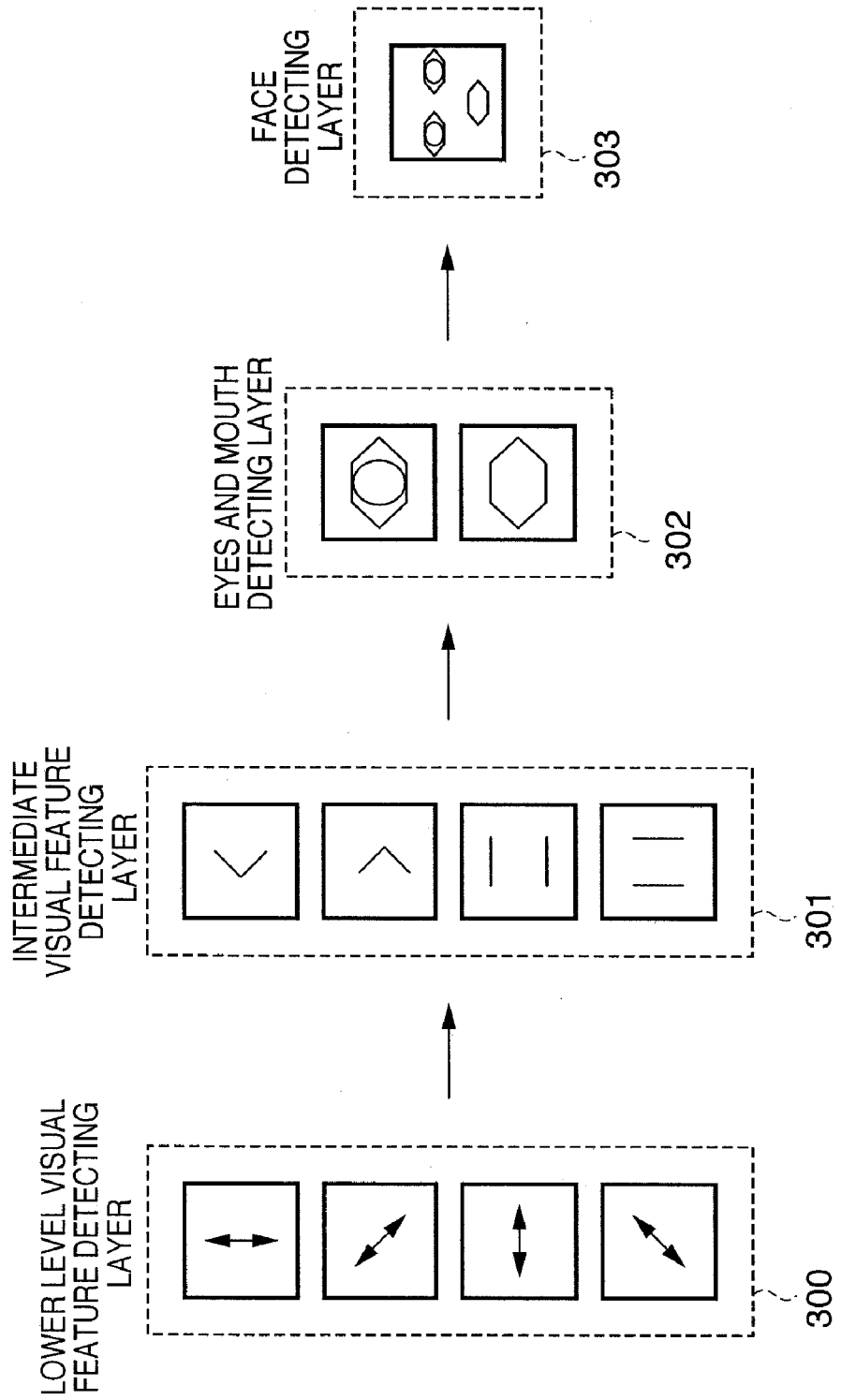

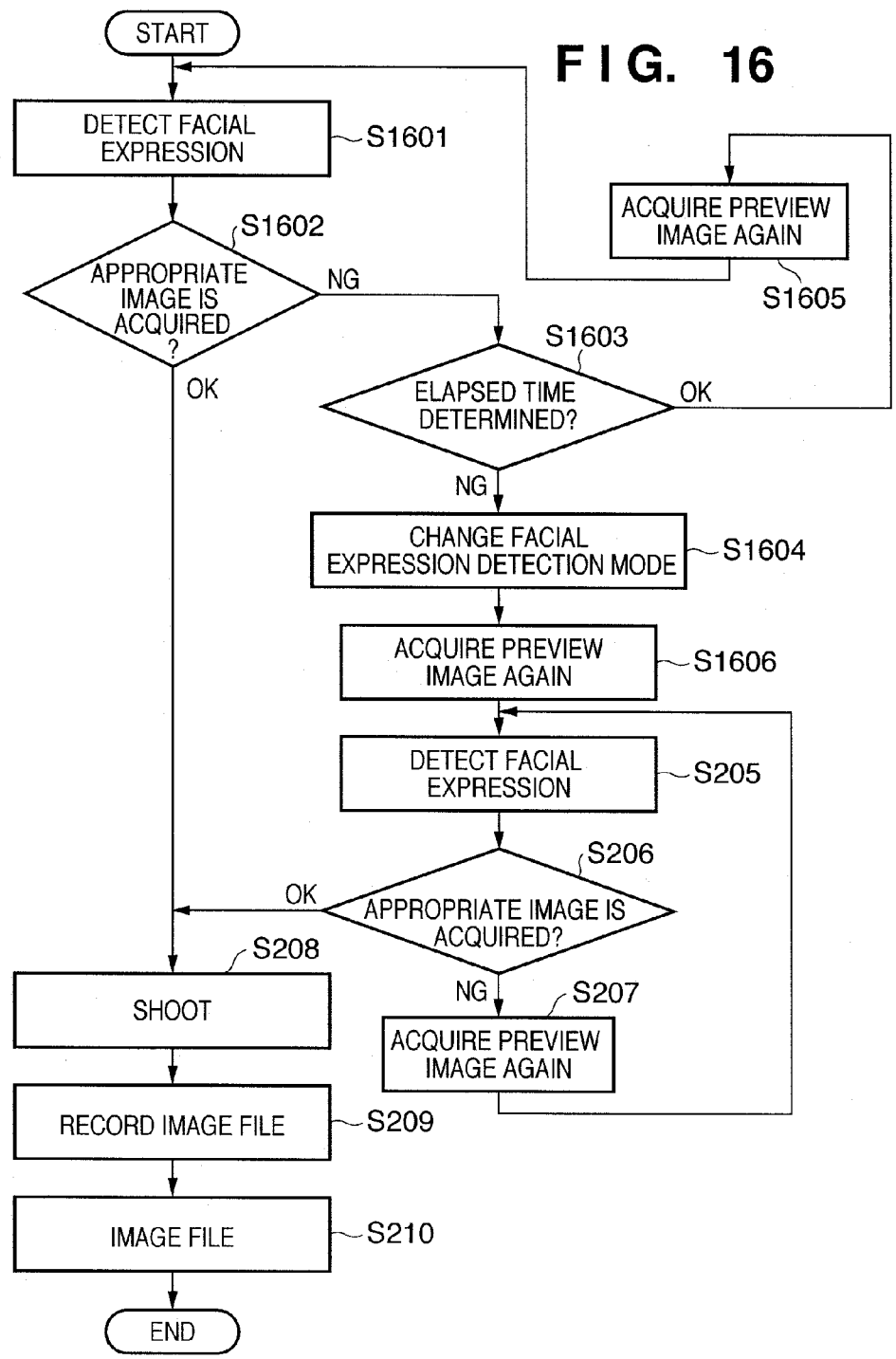

IMAGE PROCESSING APPARATUS AND CONTROL METHOD FOR SAME

BACKGROUND OF THE INVENTION

1. Field of the Invention

The present invention relates to an image processing apparatus, such as a digital camera, capable of detecting a face and/or a state of a facial feature/expression in an image and a control method for the same.

2. Description of the Related Art

An image capture system as an image processing apparatus is known that detects a state of a face of a person in a subject, such as smiling or his/her eyes being open, and enables an instant when the person is smiling or an instant when his/her eyes are open to be photographed (shot). Moreover, in JP-2004-294498-A, an image processing apparatus as a system that carries out automatic shooting when the subject achieves a desired expression or strikes a desired pose is disclosed.

However, for example, when multiple persons are included in the subject, carrying out such automatic shooting when a desired expression or pose is detected may not be easy. For example, when there are 10 people included in the subject, and, for example, times at which all of them are (naturally) smiling or all of then are (naturally) closing their eyes, may not happen often.

Further, time intervals when a plurality of conditions overlap, such as when everyone is smiling and moreover when everyone's eyes are open, may happen even less frequently. Therefore, with these systems one may need to wait a long time before automatic shooting is executed, and sometimes the automatic shooting function may be useless because the condition for triggering the automatic shooting is not met. In JP-2004-294498-A, there is no consideration given to this type of problem, which occurs when there are multiple persons involved.

This type of problem can also apply to a configuration that selects from among moving images a frame image in which multiple conditions overlap.

SUMMARY OF THE INVENTION

An embodiment of the present invention has been made in consideration of the above-described problem of the related art, and provides, in an image processing apparatus having a function that identifies a state of a subject, an image processing apparatus and a control method for the same having improved usability of the function that identifies the state of the subject even when there are multiple subjects.

According to one aspect of the present invention, there is provided an image processing apparatus comprising: a detection unit that detects a face from an image; a determination unit that, based on information relating to a face detected by the detection unit, determines a condition that is to be satisfied with respect to the detected face; and an identification unit that identifies whether or not a face detected by the detection unit is in a state that satisfies the condition. The information relating to the face comprises information relating to either a number of the detected faces or an orientation of the detected face.

According to another aspect of the present invention, there is provided a method for an image processing apparatus comprising: detecting a face from an image; based on information relating to a detected face, determining a condition that is to be satisfied with respect to the detected face; and identifying whether or not the detected face is in a state that satisfies the condition. The information relating to the face comprises information relating to either a number of the detected faces or an orientation of the detected face.

Further features of the present invention will become apparent from the following description of exemplary embodiments with reference to the attached drawings.

BRIEF DESCRIPTION OF THE DRAWINGS

FIG. 3 is a diagram showing a face detection technology that can be used in the first embodiment of the present invention;

FIG. 16 is a flow chart illustrating essential steps in a process performed by a digital camera according to a fourth embodiment of the present invention.

DESCRIPTION OF THE EMBODIMENTS

Preferred embodiments of the present invention will now be described in detail in accordance with the accompanying drawings.

First Embodiment

Figure 1:
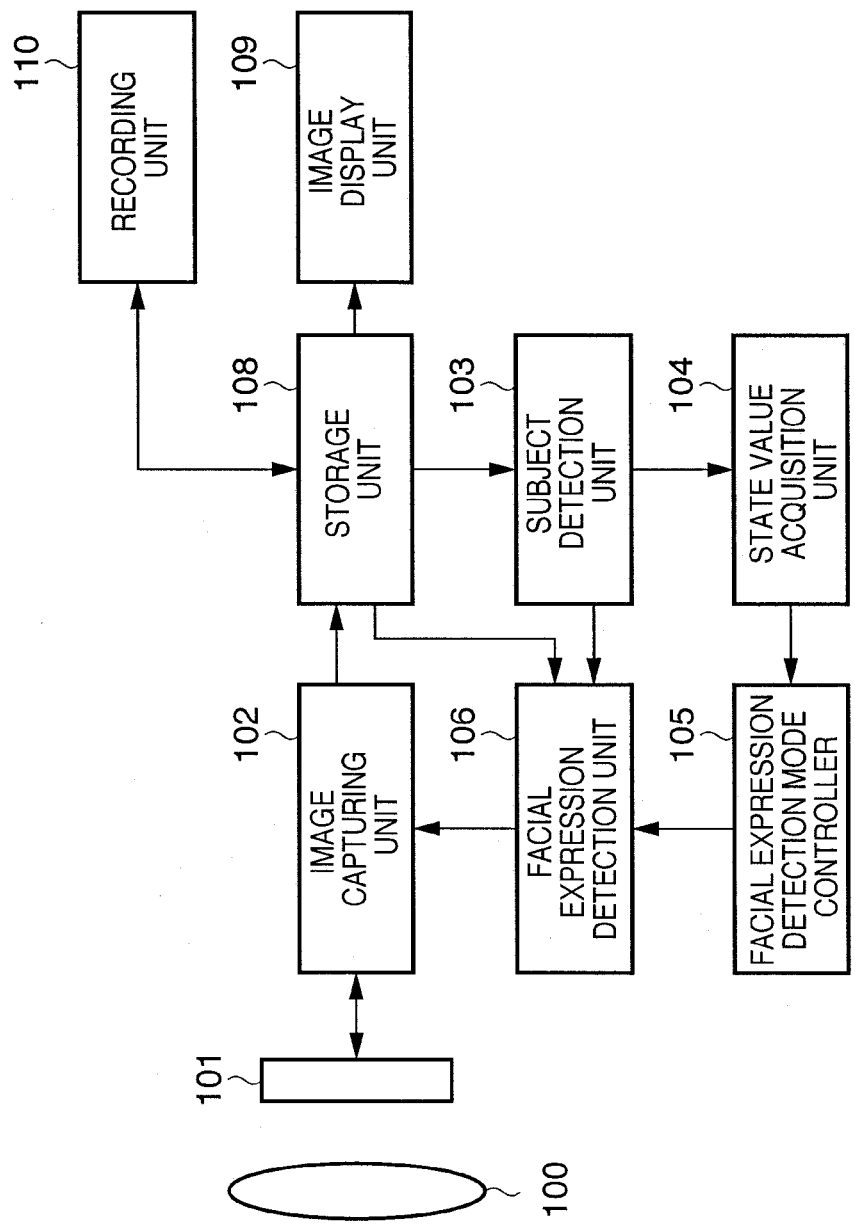
FIG. 1 is a diagram showing an example configuration of a digital camera as one example of an image processing apparatus according to a first embodiment of the present invention.

FIG. 1 is a diagram showing an example configuration of a digital camera as one example of an image processing apparatus according to a first embodiment of the present invention.

An image sensor 101 converts an image that a lens group 100 equipped with an auto focus mechanism images on an image capturing surface into electrical signals and generates image data. An image capturing unit 102 transmits read-in timing and the like to the image sensor 101. In addition, the image capturing unit 102 applies certain processing, such as white balance, color interpolation, and the like, to the image data acquired by the image sensor 101 and generates color image data, and further, generates an image file of a predetermined format (for example, JPEG). The image file is transferred to a storage unit 108.

The storage unit 108 may, for example, be a semiconductor memory. A subject detection unit 103 applies subject detection processing, such as face detection, to the image file written to the semiconductor memory. A detailed description of the subject detection process is given later. A state value acquisition unit 104 acquires information relating to a subject from the detection results provided by the subject detection unit 103. In the information relating to the subject are included the number of subjects, the size of the subject, the orientation of the subject, and so forth. A description of the specific process of acquiring information relating to the subject is given later. A recording unit 110 records an image file transferred to the storage unit 108 to a recording medium such as a memory card. In a playback mode, the recording unit 110 reads out an image file recorded on the recording medium and transfers it to the storage unit 108.

A facial expression detection mode controller 105, which acts as detection state determination means, based on information relating to the subject, sets the facial expression detection mode. In the present embodiment, a smile detection mode and the like is included in the facial expression detection mode. The smile detection mode is a mode in which shooting is carried out when the subject laughs and/or smiles. A facial expression detection unit 106 detects the facial expression of the subject according to the facial expression detection mode set by the facial expression detection mode controller 105. A detailed description of the facial expression detection process is given later. The facial expression detection unit 106, when a facial expression in accordance with the facial expression detection mode is detected, transmits an instruction to shoot to the image capturing unit 102. An image display unit 109 displays images recorded in the storage unit 108. The image display unit 109 is comprised of a display device including an LCD.

Figure 2:
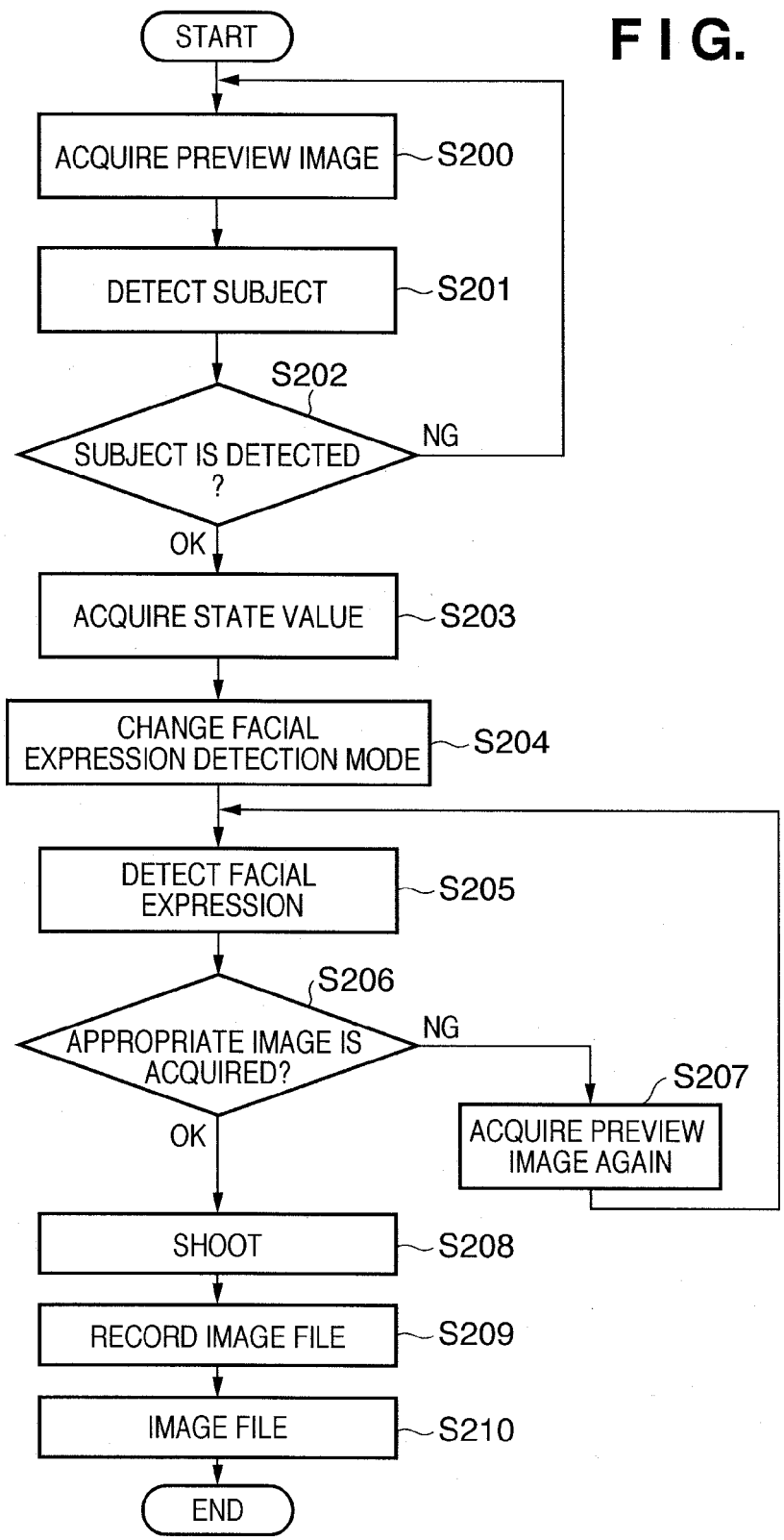
FIG. 2 is a flow chart illustrating the overall order of processing carried out by the digital camera according to the first embodiment of the present invention.

Next, a description is given of the overall order of processing carried out by the digital camera of the present embodiment, using the flow chart shown in FIG. 2.

In S200, the image capturing unit 102 acquires data for preview image use from the image sensor 101 and renders it to the storage unit 108. The preview image may be of a lower resolution than the highest resolution of which the image sensor 101 is capable. However, it is preferable that the resolution be such as to not obstruct subject detection in the subject detection unit 103.

Next, in S201, the subject detection unit 103 carries out a subject detection process on the entire preview image stored in the storage unit 108. The subject detection unit 103 carries out detection of a particular type of subject, for example a person, from the image. Detection of a person may be accomplished using any known face detection technology, such as pattern detection by support vector machine or a multilayer neural network.

An example of a face detection technology that can be applied to an embodiment of the present invention is described with reference to FIG. 3.

In this example, face detection by a multilayered process is carried out, in which an input image is processed by, in order, a lower level visual feature detecting layer 300, an intermediate visual feature detecting layer 301, an eyes and mouth detecting layer 302, and a face detecting layer 303, and the face ultimately detected.

The lower level visual feature detecting layer 300 is a layer that detects edges in an image. The intermediate visual feature detecting layer 301 is a layer that detects corner-like features of the eyes as well as linear edges of the eyelids or lips. The eyes and mouth detecting layer 302 is a layer that detects higher level features such as the eyes or the mouth. Lastly, the face detecting layer 303 detects the face from the results of the detection of the eyes and the mouth.

This type of known face detection technology that detects in layers from low visual feature to high visual feature is described in detail in M. Matsugu, K. Mori, et. al, "Convolutional Spiking Neural Network Model for Robust Face Detection," 2002, International Conference on Neural Information Processing (ICONIP02).

To return to the description of FIG. 2, in S202 the image capturing unit 102 determines whether or not a subject, in this case a person, has been detected by the subject detection unit 103. If no subject is detected, processing returns to S200 and the image capturing unit 102 again acquires a preview image.

By contrast, if a subject is detected, in S203 the state value acquisition unit 104 acquires information relating to the subject (state value) from the face detection results produced by the subject detection unit 103. In the present embodiment, the number of faces detected is used as information relating to the subject. The number of faces can be acquired from the subject detection unit 103.

Of the faces thus detected, the subject detection unit 103 only counts as a detected face or faces those for which a face region size is equal to or greater than a predetermined threshold, to ensure that only those faces existing as major subjects are counted. The threshold for the face region size that determines whether or not to count a face as a detected face, that is, whether or not to deem a face a major subject, can as one example be obtained as described below.

First, from the individual face region sizes $S_i$ of the detected faces (where i is the number of detected faces and i=1, 2 . . . n), obtain the face region size average $S_{mean}$ and standard deviation $\sigma$. Then, make $S_{mean}-\sigma$ the threshold for the face region size. As a result, of the detected faces, those with face region sizes equal to or greater than $S_{mean}-\sigma$ are counted and provided to the state value acquisition unit 104.

Figure 4C:
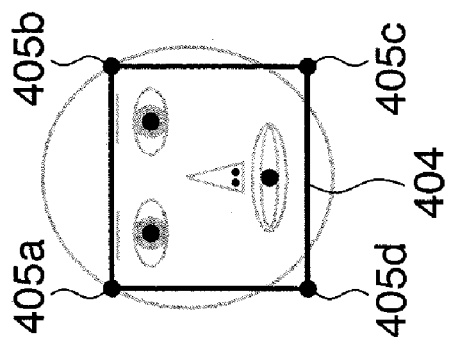
FIGS. 4A-4C are diagrams illustrating examples of defining a face region size in the first embodiment of the present invention.
Figure 4B:
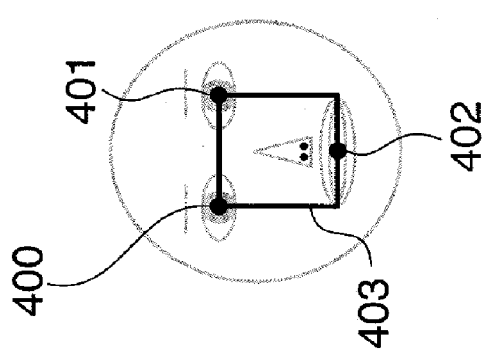
Figure 4A:
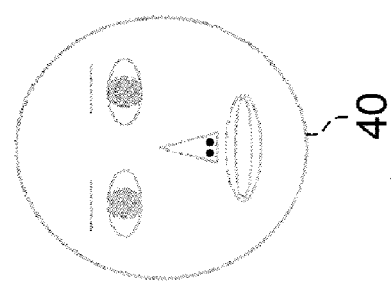

A definition of face region size in the present embodiment is now given, with reference to FIGS. 4A-4C.

A model face 40 shown in FIG. 4A is a schematic representation of a face. Here, a face region A 403 shown in FIG. 4B is defined as the region enclosed by a square region with a right eye feature point 400 and a left eye feature point 401 as apexes and a side that passes through a mouth feature point 402. By thus determining the face region using as references the face and its features, that is, the eyes and the mouth, a face region can be set that reflects the size of the face in the image. The positions of the facial features, that is, the eyes and the mouth, can be identified from the detection results produced by the eyes and mouth detecting layer 302.

Figure 5A:
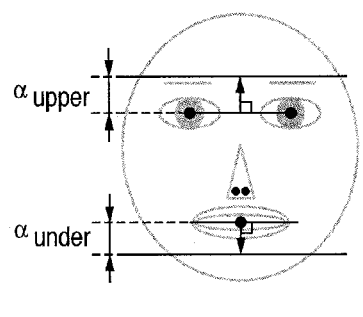
FIGS. 5A-5B are diagrams illustrating other examples of defining a face region size in the first embodiment of the present invention.

FIG. 4C shows another example of face region definition. A face region B 404 shown in FIG. 4C is a region that expands the face region A 403 both vertically and horizontally. The expansion in the vertical direction, as shown in FIG. 5A, is perpendicular to a line connecting the two eyes and extending toward the top of the head $a_{upper}$ [pixel], as well as perpendicular to the side passing through the mouth feature point

Figure 5B:
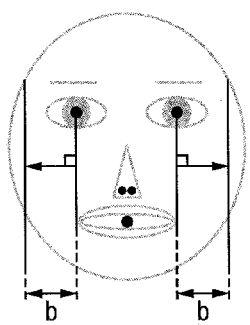

402 and extending toward the jaw $a_{lower}$ [pixel]. The expansion in the horizontal direction, as shown in FIG. 5B, is at right angles to lines drawn from the left eye and the right eye to the Y coordinates of the mouth feature in the horizontal outward direction of face region A 403 b[pixel].

By setting values for the constants $a_{upper}$, $a_{under}$, and b, a face region that includes all of the eyes and mouth as well as the eyebrows can be set. These constants $a_{upper}$, $a_{under}$, and b may be set as values that are proportional to the size of the face region A 403 shown in FIG. 4B. In the present embodiment, so long as there is no particular objection, the face region B 404 is used. Therefore, the face region size can be calculated by obtaining apex coordinates 405a through 405d of the face region B 404.

To return to the description of FIG. 2, in S204 the facial expression detection mode controller 105, based on the information relating (the state value) to the subject that the state value acquisition unit 104 acquires, determines and sets the facial expression detection mode. In the present embodiment, the facial expression detection mode defines what sort of subject's facial expression to detect. In the present embodiment, the state value acquisition unit 104 acquires the number of faces detected and moreover counted as the state value, and therefore in the facial expression detection mode controller 105 as well the facial expression detection mode is set based on this number of faces.

Figure 6:
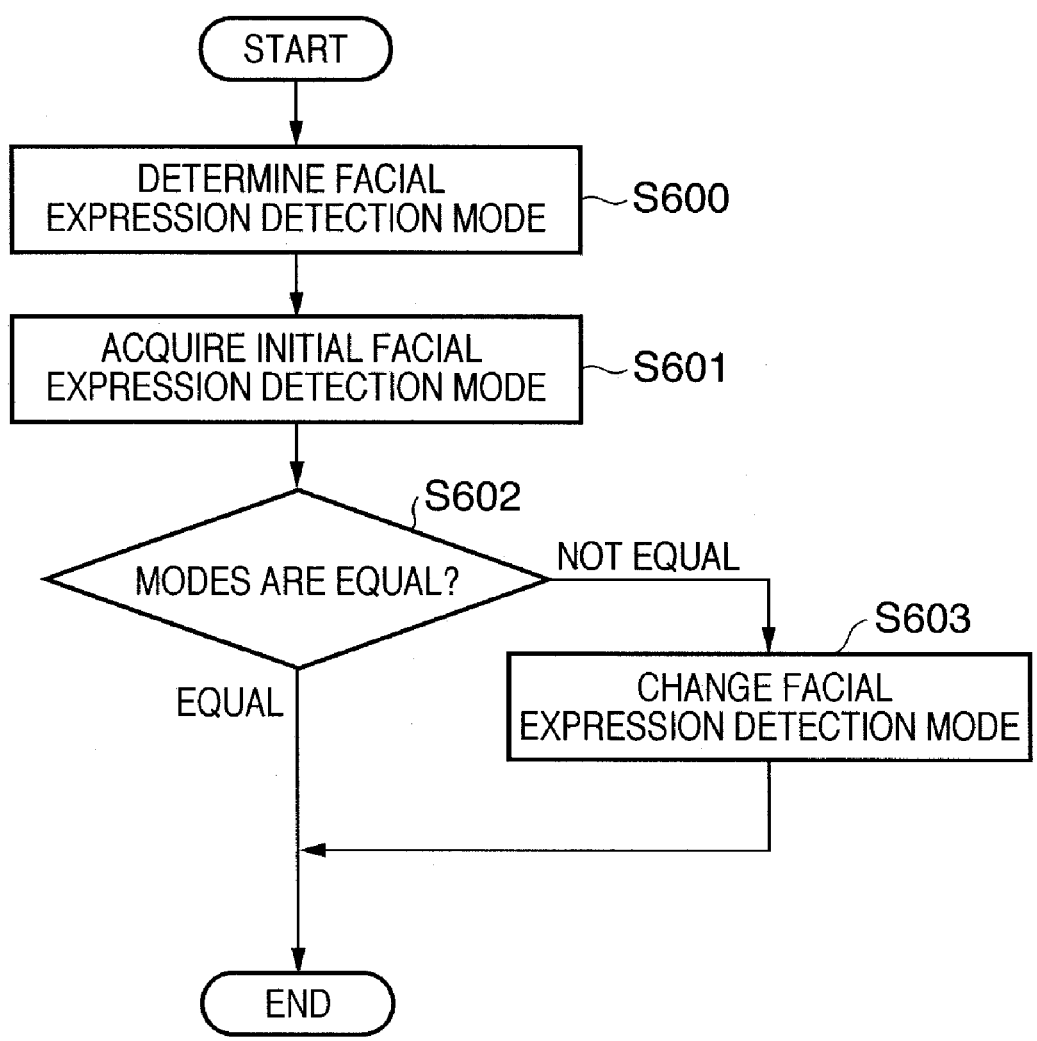
FIG. 6 is a flow chart illustrating a facial expression detection mode change process in the first embodiment of the present invention.

FIG. 6 is a flow chart illustrating a facial expression detection mode change process carried out by the facial expression detection mode controller 105 in the present embodiment.

In S600, the facial expression detection mode controller 105 determines the facial expression detection mode based on the state value acquired by the state value acquisition unit 104. A detailed description of this process is given later. Next, in S601, the facial expression detection mode controller 105 acquires a currently set facial expression detection mode as an initial facial expression detection mode. The currently set facial expression detection mode is either a mode set at the time the digital camera of the present embodiment is shipped or a mode that a user sets as an initial value.

Next, in S602, the facial expression detection mode controller 105 compares the currently set facial expression detection mode and the facial expression detection mode determined in S600. If the results of the comparison are not equal, then in S603 the facial expression detection mode controller 105 changes the facial expression detection mode to the mode set in S600. By contrast, if the results of the comparison indicate that the facial expression detection modes are equal, then the facial expression detection mode controller 105 ends processing without changing the facial expression detection mode.

Figure 7:
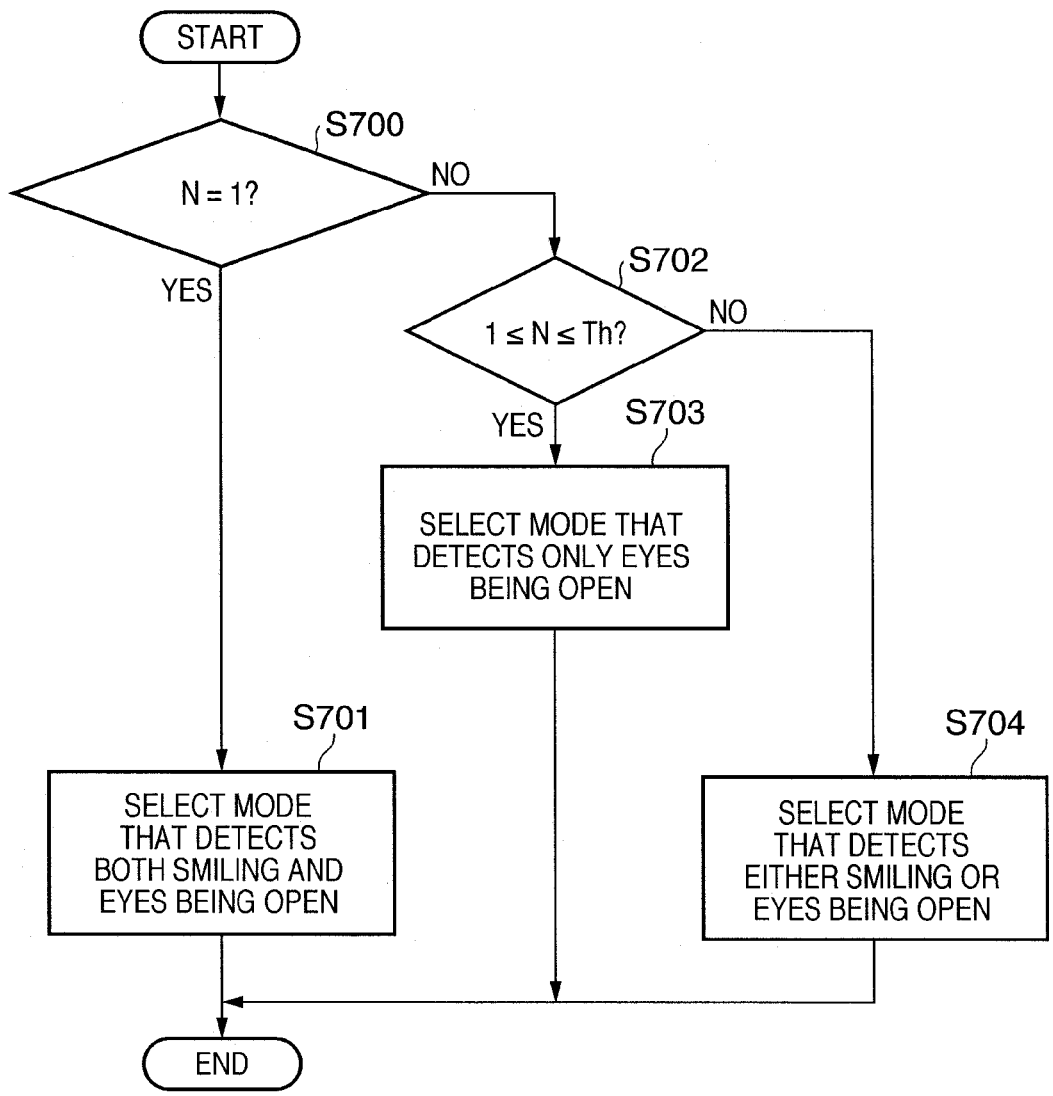
FIG. 7 is a flow chart illustrating a facial expression detection mode determination process in the first embodiment of the present invention.

A description is now given of the content of the facial expression detection mode determination process performed in S600 shown in FIG. 6, using the flow chart shown in FIG. 7.

Although two types of facial expressions of the subject, smiling and eyes open, are detectable in the present embodiment, in other words two types of facial expression detection modes exist, the present embodiment is not limited thereto. It should be noted that, when the subject's eyes are not open the subject's eyes might be closed, and therefore detection of closed eyes is also possible.

Assume that the number of faces detected as well as meeting the conditions described above and counted by the subject detection unit 103 is N (where N is an integer equal to or greater than zero). This number N is provided to the facial expression detection mode controller 105 through the state value acquisition unit 104.

In S700, the facial expression detection mode controller 105 determines whether or not N=1. When N=1, that is, when the major subject is just one person, the facial expression detection mode controller 105 in S701 sets an eyes open and smiling face detection mode that detects simultaneous satisfaction of smiling and eyes being open (eyes not closed). In this mode, the facial expression detection mode controller 105 determines that the major subject meets the condition only when it detects simultaneous satisfaction of both smiling and eyes being open. Such a determination is made because, in the case of one major subject, compared to a case in which there are multiple subjects, it is easy to acquire an expression at an instant at which his/her eyes are open and moreover he/she is smiling.

Next, a description is given of a case in which, in S702, 1<N≦Th (where Th is an integer equal to or greater than 2). Here, Th is a threshold, a predetermined value set through experience. When 1<N≦Th, the facial expression detection mode controller 105 determines a mode that detects satisfaction of only the eyes being open (S703). When multiple persons are major subjects, it is more difficult to capture an instant at which everyone has his/her eyes open and is smiling at the same time than it is when N=1. However, as in the case of a photograph, generally a state in which the subject (every person in the picture) has his/her eyes open is desired. Accordingly, in this case, the facial expression detection mode controller 105 determines and sets the mode that detects satisfaction of only the eyes being open condition. In this mode, when it is detected that the eyes are open the facial expression detection mode controller 105 determines that the major subject meets the condition regardless of whether that person is smiling or not.

In other words, this is a mode that acquires an image that meets the condition of each and every major subject's eyes being open.

When Th<N, that is, when there are numerous major subjects as in a group photograph, the facial expression detection mode controller 105 determines a mode that detects satisfaction of either the eyes being open or the face smiling (S704). In a group photograph scene, it is difficult to simultaneously detect and capture an instant at which everyone has his/her eyes open and is also smiling or an image in which every subject has a facial expression in which his/her eyes are open. Accordingly, when Th<N, in order to further relax the condition, the facial expression detection mode controller 105 determines and sets a mode that detects satisfaction of either the subjects' eyes being open or the subjects' smiling. In this mode, when at least one of smiling and the eyes being open is detected, the facial expression detection mode controller 105 determines that the major subject meets the condition, regardless of the detection result of the other.

In other words, this is a mode that acquires an image that meets the condition of each and every major subject either having his/her eyes open or smiling.

To return to FIG. 2, in S205 the facial expression detection unit 106, in accordance with the facial expression detection mode that the facial expression detection mode controller 105 set in S204 and the information relating to the position of the face region of the major subject acquired from the subject detection unit 103, executes facial expression detection of the major subject(s) in the preview image. As described above, the facial expressions detected in the present embodiment are eyes being open and face smiling. The facial expression detection unit 106 detects the respective facial expressions using suitable technologies.

For example, the eyes being open can be detected by detecting the whites of the eyes or the irises of the eyes in the face region. Alternatively, a technique of detecting the upper and lower lids of the eyes by edge searching and detecting the eyes being open by the degree to which the lids are open may be used. In addition, detection of a smile can be carried out using a method like that disclosed in JP-2005-56388-A, for example. It should be noted that, in the present embodiment, to simplify description and facilitate understanding, the only facial expression detected is that of a smiling face. However, alternatively, other facial expressions, such as expressions that indicate joy and anger, for example an angry expression or a crying expression, can be detected and used as conditions for automatic shooting. The facial expression detection unit 106, in order to handle movement in the position of the face of the subject, can track the face within the frame using any known technology, for example optical flow.

In S206, the facial expression detection unit 106 determines from the detection results of S205 whether an appropriate image, in which all the major subjects meet the state of the facial expression detection mode has been set, could be acquired. If there are major subjects for which the state is not met, a request is made of the image capturing unit 102 for a preview image (S207). Then, facial expression detection is conducted on the newly acquired preview image by the facial expression detection unit 106. The processes of S205-S207 are repeatedly executed until an image in which all the major subjects meet the state for the facial expression detection mode is acquired.

Figure 8:
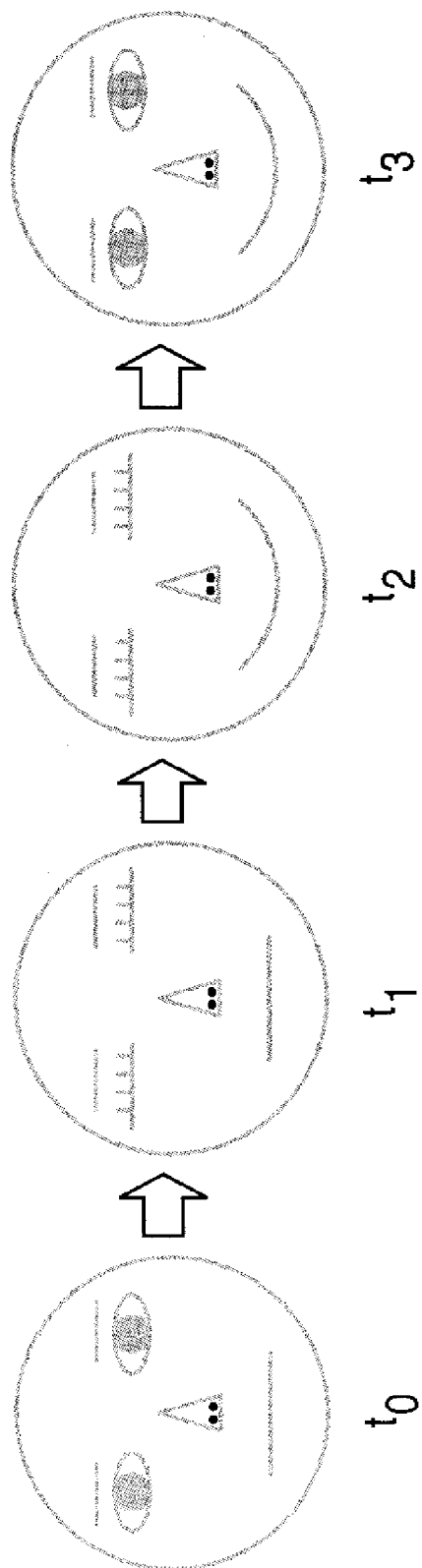
FIG. 8 is a diagram showing a change in expression of a face over time.
Figure 9:
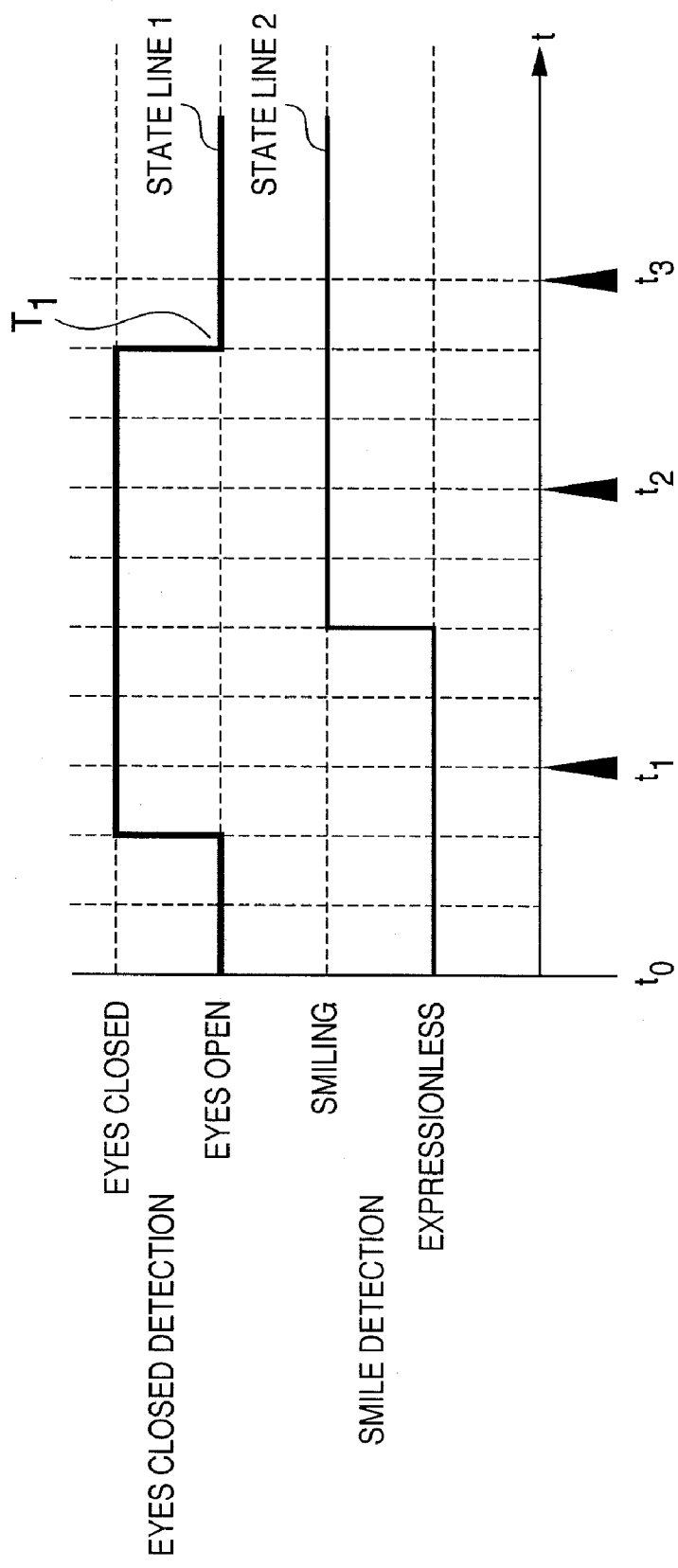
FIG. 9 is an expression shift chart corresponding to FIG. 8.

Examples of the processes of image acquisition, facial expression detection, and shooting determination are now described, using FIG. 8 and FIG. 9.

FIG. 8 shows an example of change over time in facial expression detected from an acquired image. A facial expression detected at a time $t_0$ is one in which both eyes are open (eyes open) and the face is expressionless (not smiling). Next, at a time $t_1$, both eyes are closed (eyes closed) and the face is expressionless. At a time $t_2$, the eyes are closed and the face is smiling, and at a time $t_3$, the eyes are open and the face is smiling.

Assuming that the facial expression changes as shown in FIG. 8, then a shooting timing, that is, the best time to take a shot, would probably be around a time close to the time $t_3$ if the facial expression detection mode is an eyes open and face smiling detection mode (in the present embodiment, when N=1).

FIG. 9 is a facial expression shift chart expressing in graph form the change in facial expression illustrated in FIG. 8.

The horizontal axis of the facial expression shift chart shown in FIG. 9 represents time (the timing with which the preview image is acquired) and the vertical axis represents facial expressions that can be determined from the results of the smiling and eyes open detection process. That is, a state line 1 shown in the facial expression shift chart indicates change over time in eyes closed or eyes open, and a state line 2 indicates change over time in whether smiling or whether expressionless (not smiling).

When the eyes open and smiling face detection mode is set, shooting timing is at $T_1$ shown in FIG. 9. Thus, the processes of S205-S207 are repeatedly executed until the state shown at $T_1$ in FIG. 9 can be acquired.

Once it is determined that facial expression detection results that match the condition have been obtained, that is, once the state shown at $T_1$ in FIG. 9 in the present embodiment is obtained, the facial expression detection unit 106 outputs an instruction to carry out a process of shooting an image to the image capturing unit 102 (S208). In response thereto, the image capturing unit 102 carries out a process of shooting an image for recording.

The image capturing unit 102 applies the image processing described above to the image thus captured, creates an image file of a predetermined format (for example, JPEG), and transfers the image file to the storage unit 108. Next, the recording unit 110 records the image file stored in the storage unit 108 into a recording medium such as a memory card (S209). For confirmation purposes, the image file stored in the storage unit 108 is displayed by the image display unit 109 (S210).

Thus, as described above, the present embodiment detects the number of major subjects present in a captured image, for example, the number of persons, and changes a condition relating to a state of a major subject or major subjects that should be detected depending on the number of major subjects. Specifically, the larger the number of major subjects the easier the condition.

For example, when the major subject is a person and the state of the subject that should be detected is the expression of the face, the greater the number of major subjects, the more relaxed the condition relating to facial expression that all the major subjects should meet. As a result, the problem of automatic shooting not being readily carried out can be reduced when the condition relating to the state of the major subjects that should be detected is fixed, and moreover the condition is such that it is difficult to meet it when the number of major subjects grows large. In addition, since the apparatus of the present embodiment conducts such dynamic condition change automatically, the burden on the user can be lightened.

It should be noted that although the present embodiment sets the mode that meets multiple conditions relating to facial expression (smiling and eyes open) simultaneously only when there is one major subject, alternatively such mode may be set when there are two or more major subjects. The value of the threshold Th in the foregoing description can be determined as appropriate depending on the degree of difficulty of meeting the conditions, the extent of the change in the degree of difficulty for the number of subjects, and so forth.

In addition, as in a group photo, when the subjects are conscious of being the object of a photograph, since each individual subject is highly self-conscious, compared to all other situations the possibility of meeting the conditions increases. As a result, matters may be configured so that the user can change the value of the threshold Th dynamically so that it can be adjusted according to shooting conditions. In this case, the user can eliminate troublesome operations while taking maximum advantage of the capabilities of the image processing apparatus.

Further, matters may be arranged so that automatic shooting is carried out not when all the faces counted as major subjects satisfy the set mode but rather when conditions relating to a top predetermined number of faces (for example the first 5) having a face region size equal to or greater than a predetermined value are met.

In addition, particularly when N is large, matters may be arranged so that, as the number of times the preview image is re-acquired increases, the number of major subjects that should meet the conditions is decreased. With such a configuration, it is possible to reduce the occurrence of situations in which shooting is not carried out readily.

Although in the present embodiment a description is given of an example of a configuration in which, when the major subject satisfies conditions relating to facial expression, the facial expression detection unit 106 outputs an instruction to shoot to the image capturing unit 102, the present invention is not limited to such a configuration.

For example, the technology described above can also be used with an application that extracts index-use image data from a previously recorded moving image file.

Assume that a moving image file is already recorded in the recording unit 110. This moving image file may be a moving image file generated from image data acquired continuously by the image sensor 101 or it may be a moving image file obtained in advance by another camera or by a computer.

The subject detection unit 103, through the storage unit 108, sequentially reads out from the recording unit 110 the frame images that make up the moving image file and carries out subject detection thereon. If the subject detection unit 103 is unable to detect a face from the read-out frame images, it then sequentially reads out new frame images and carries out the subject detection process.

When a face is detected from the read-out frame images, the state value acquisition unit 104 acquires information (state value) relating to the subject from the face detection results provided by the subject detection unit 103.

The facial expression detection mode controller 105, in accordance with the flow chart shown in FIG. 7, based on the number of faces acquired by the state value acquisition unit 104, determines and sets the facial expression detection mode. Then, the facial expression detection unit 106 executes facial expression detection of the major subject or major subjects in the frame image. When there are major subjects that do not meet the conditions, the facial expression detection unit 106 reads out a new frame image and executes facial expression detection of the major subject or major subjects in the frame image, repeating this process until an image is acquired in which all the major subjects meet the condition.

Once it is determined that the facial expression detection unit 106 has obtained facial expression detection results that match the condition, that frame image is transferred to the storage unit 108 and the recording unit 110 records that frame image as an index image file, and links it to the original moving image file.

Thus, as described above, even when generating an index image file from a moving image file, a technology of dynamically changing conditions relating to the state of the major subject or major subjects that should be detected in response to the number of major subjects present in the image is effective.

In addition, the technology described above can be implemented with any apparatus that it is comprised of a configuration that satisfies the same functions of the subject detection unit 103, the state value acquisition unit 104, the facial expression detection mode controller 105, and the facial expression detection unit 106 described herein, in which case the apparatus need not necessarily be an image capturing apparatus and may instead by a personal computer or an apparatus equipped with a video recorder or other image processing capability.

Second Embodiment

A description is now given of a second embodiment of the present invention.

The distinctive feature of the second embodiment is that a separate facial expression detection mode is set for each face counted as a major subject. An image processing apparatus according to the second embodiment may have the same configuration as the digital camera described with respect to the first embodiment, with the only difference being the facial expression detection mode change process implemented in S204 in FIG. 2. Therefore, in the following only a description of the distinctive facial expression detection mode change process of the present embodiment is given.

Figure 10:
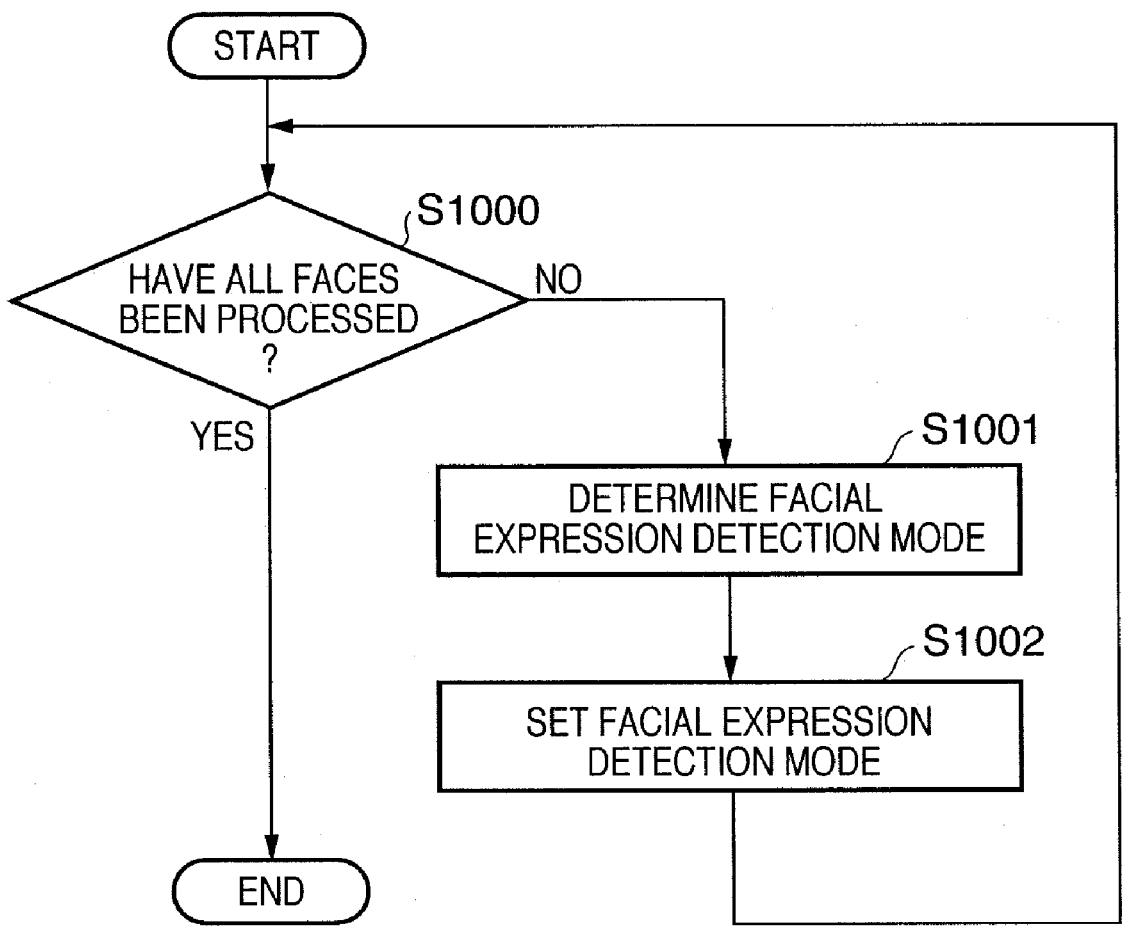
FIG. 10 is a flow chart illustrating a facial expression detection mode change process in a digital camera according to a second embodiment of the present invention.

FIG. 10 is a flow chart illustrating the facial expression detection mode change process in the digital camera according to the second embodiment of the present invention.

In the present embodiment, for N faces counted as major subjects the subject detection unit 103 provides information identifying each individual face region and information relating to its orientation from the state value acquisition unit 104 to the facial expression detection mode controller 105 as state values.

In S1000, the facial expression detection mode controller 105 determines whether or not setting of the facial expression detection mode for all faces given state values from the state value acquisition unit 104 is finished. If facial expression detection mode setting for all faces is finished, processing is ended. If unprocessed faces remain, processing proceeds to S1001.

In S1001, the facial expression detection mode controller 105 determines the facial expression detection mode for each face based on the face orientation information provided from the state value acquisition unit 104. This process is described in detail later. Next, in S1002, the facial expression detection mode controller 105 sets the determined facial expression detection mode for a face or faces to be processed.

Figure 11:
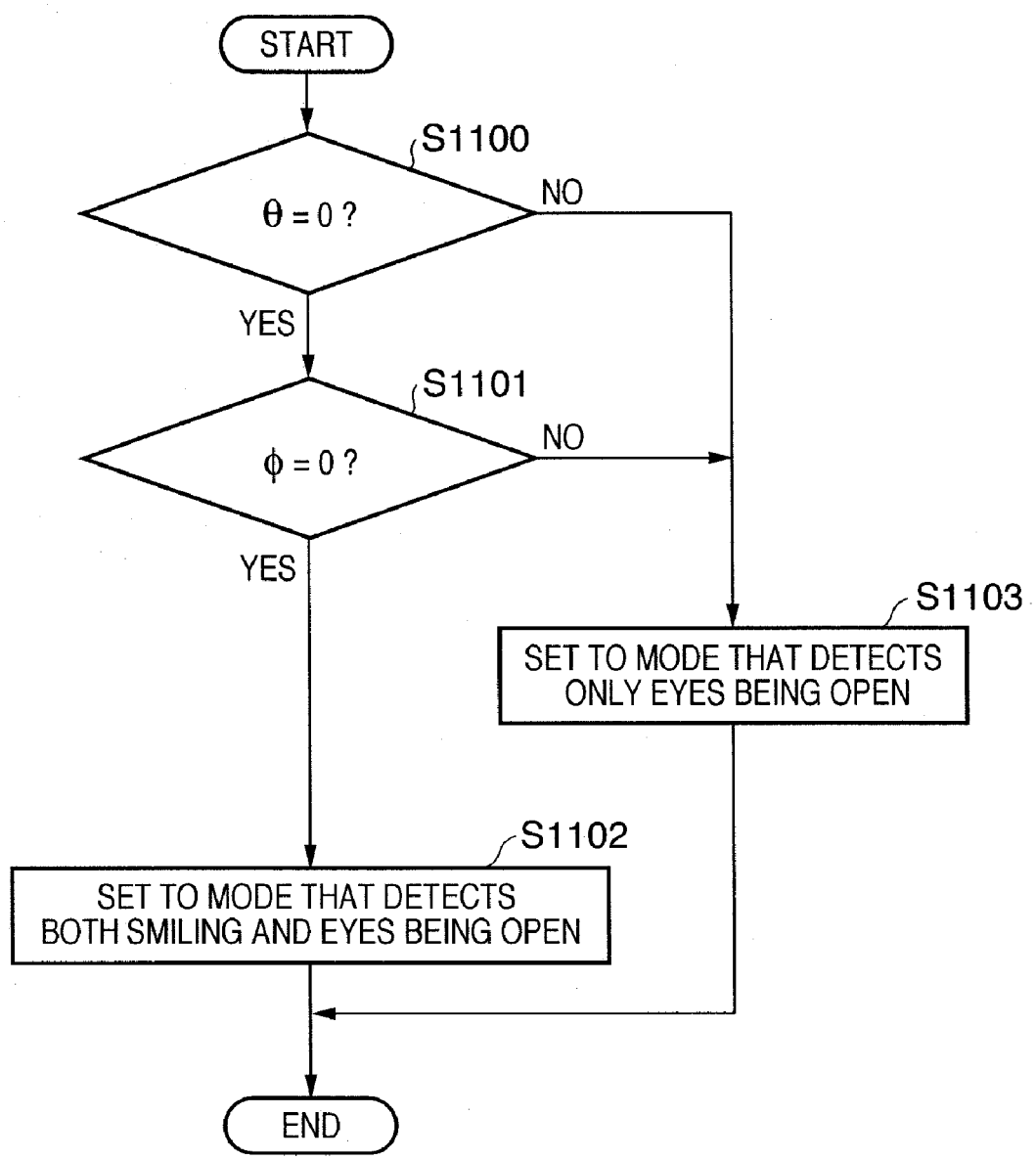
FIG. 11 is a flow chart illustrating a facial expression detection mode determination process in the second embodiment of the present invention.

FIG. 11 is a flow chart illustrating a facial expression detection mode determination process carried out in S1001 shown in FIG. 10.

Figure 12:
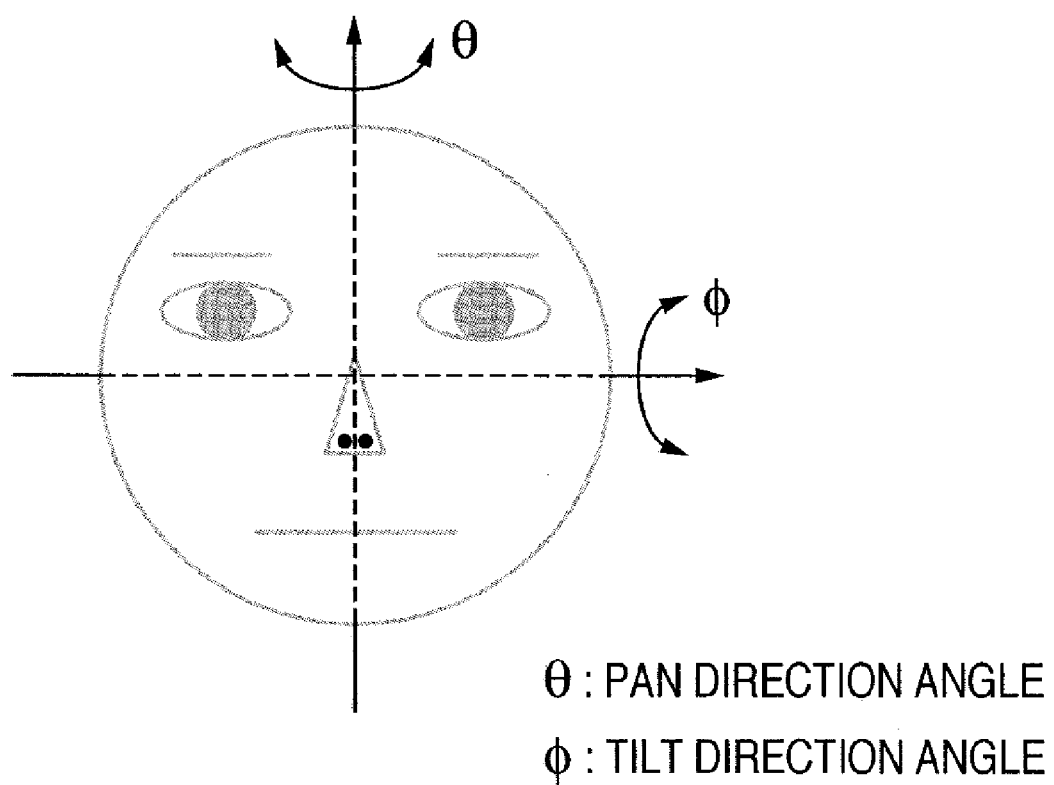
FIG. 12 is a diagram showing angles in a pan direction and in a tilt direction indicating an orientation of a face in the second embodiment of the present invention.

S1100 and S1101 check whether a pan direction angle $\theta$ and a tilt direction angle $\phi$ of the face is 0 and carries out a face orientation determination process. The pan direction angle $\theta$ and the tilt direction angle $\phi$ are as shown in FIG. 12.

Here, the pan direction angle $\theta$ and the tilt direction angle $\phi$ can be obtained by, for example, providing multiple face detectors specializing in detection of a face oriented at a particular angle in the subject detection unit 103 and using the output of these face detectors for particular angles. Then, the state value acquisition unit 104 takes the pan direction angle $\theta$ and the tilt direction angle $\phi$ of each major subject obtained by the subject detection unit 103 and supplies them as state values to the facial expression detection mode controller 105 together with information that identifies a corresponding face region, for example face region position information.

Figure 13:
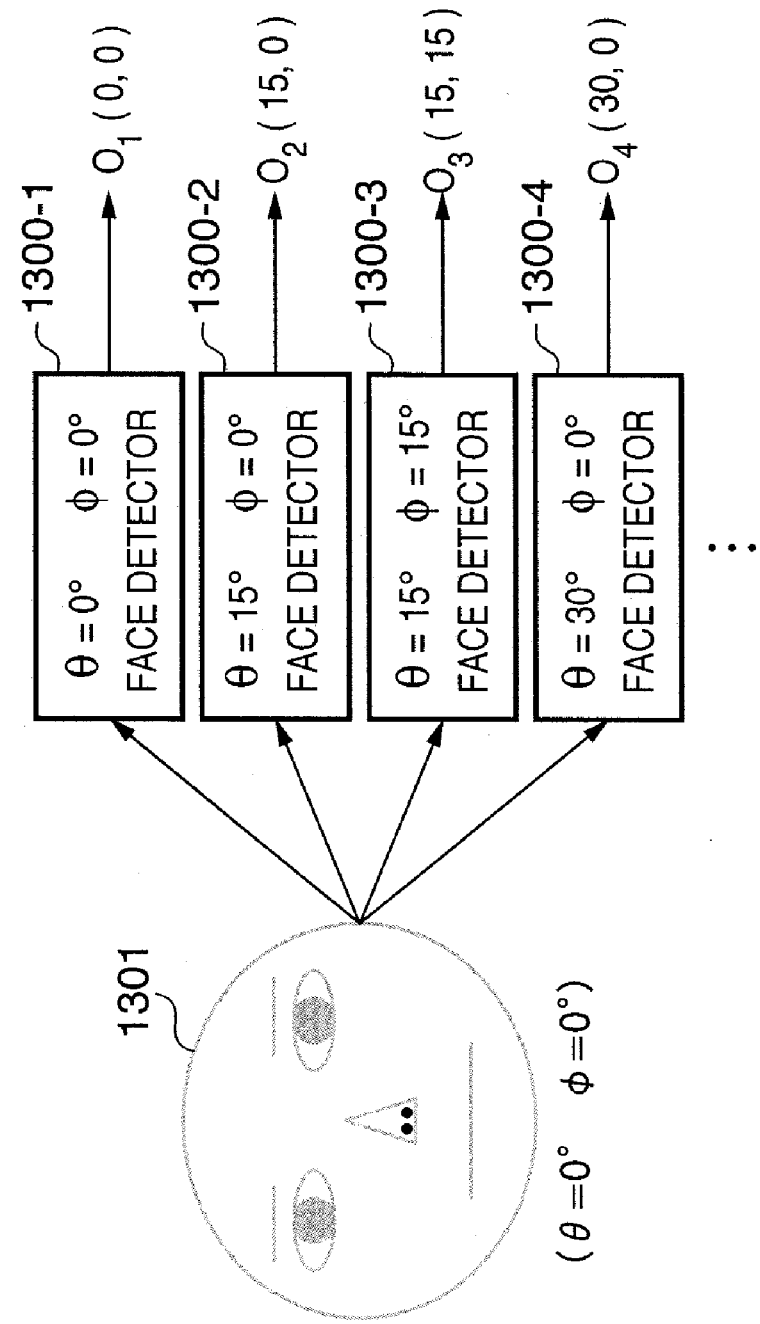
FIG. 13 is a diagram showing schematically a process of obtaining the orientation of the face of a major subject in the second embodiment of the present invention.

FIG. 13 is a diagram showing schematically a process of obtaining the orientation of the face of the major subject in the subject detection unit 103.

In this process, n face detectors 1300-1 through 1300-n are provided for different pan direction angles $\theta$ and tilt direction angles $\phi$, with the output of the detectors being $O_i$ (i=1, 2 . . . n). The face detectors 1300-1 through 1300-n are each configured so as to obtain the maximum output for the face at different yet certain particular pan direction angles $\theta$ and tilt direction angles $\phi$.

An input face 1301 shown in FIG. 13 faces full front, and therefore $\theta=0°$ and $\phi=0°$. In this case, the output of the face detector 1300-1 for $\theta=0°$ and $\phi=0°$ shows the highest value. By contrast, when a face that does not face full front, for example a face at $\theta=15°$ and $\phi=0°$ is input, the output of the face detector 1300-1 shows the highest value. Angles not directly handled by any face detector can be estimated based on the values of a plurality of face detectors. For example, for a face for which the orientation is $\theta=10°$ and $\phi=0°$, the output of the face detector 1300-2 for $\theta=15°$ and $\phi=0°$ is strongest and the output of the face detector 1300-1 for $\theta=0°$ and $\phi=0°$ becomes stronger, with the output of the other face detectors becoming much smaller compared to the output of these two. Therefore, by a process of interpolative calculation based on the relation between the outputs of the face detectors 1300-1 and 1300-2, an orientation of θ=10° and φ=0° is estimated.

As described above, the process illustrated by the flow chart shown in FIG. 11 is applied to each individual face detected in the image and counted as a major subject in the subject detection unit 103.

In the event that the face does not match one of S1100 and S1101, that is, in the event that the face does not face full front, in S1103 the mode that detects only the eyes being open is set for the target face. By contrast, if the face does face full front, then the mode that detects both smiling and the eyes being open is set for the target face.

The facial expression detection unit 106 receives the corresponding facial expression detection mode setting from the facial expression detection mode controller 105 together with the information relating to the position of the face region of the major subject. Then, the same set facial expression detection is conducted for each individual major subject in the preview image and an instruction to shoot is output to the image capturing unit 102 if all the major subjects have a facial expression that satisfies the setting.

In the present embodiment, in the event that conditions are not met even after a predetermined number of repetitions of the processes of S205-S207 shown in FIG. 2, processing returns to S201 and the subject detection process is carried out once again, which enables the best mode to be set dynamically in response to changes in the orientation of the face of the major subject. Further, the facial expression detection unit 106, in order to handle movement in the position of the face of the subject, can track the face within the frame using any known technology, for example optical flow.

Thus, as described above, the present embodiment changes the setting of the facial expression that should be detected for each of the major subjects according to the orientation of the face of the major subject, thus enabling erroneous detection of facial expression due to a change in orientation of the face to be prevented.

Third Embodiment

Next, a description is given of a third embodiment of the present invention. A digital camera according to the third embodiment sets a mode that detects only the eyes being open for all persons when the number of major subjects is equal to or greater than a predetermined number. Then, after automatically sensing a predetermined number of images, it selects one based on the state of the subject.

The difference between the third embodiment and the first embodiment is in the content of the shooting process (S208) and the storage process (S209) shown in the flow chart shown in FIG. 2, and thus the following description concentrates on these differing processes.

Figure 14:
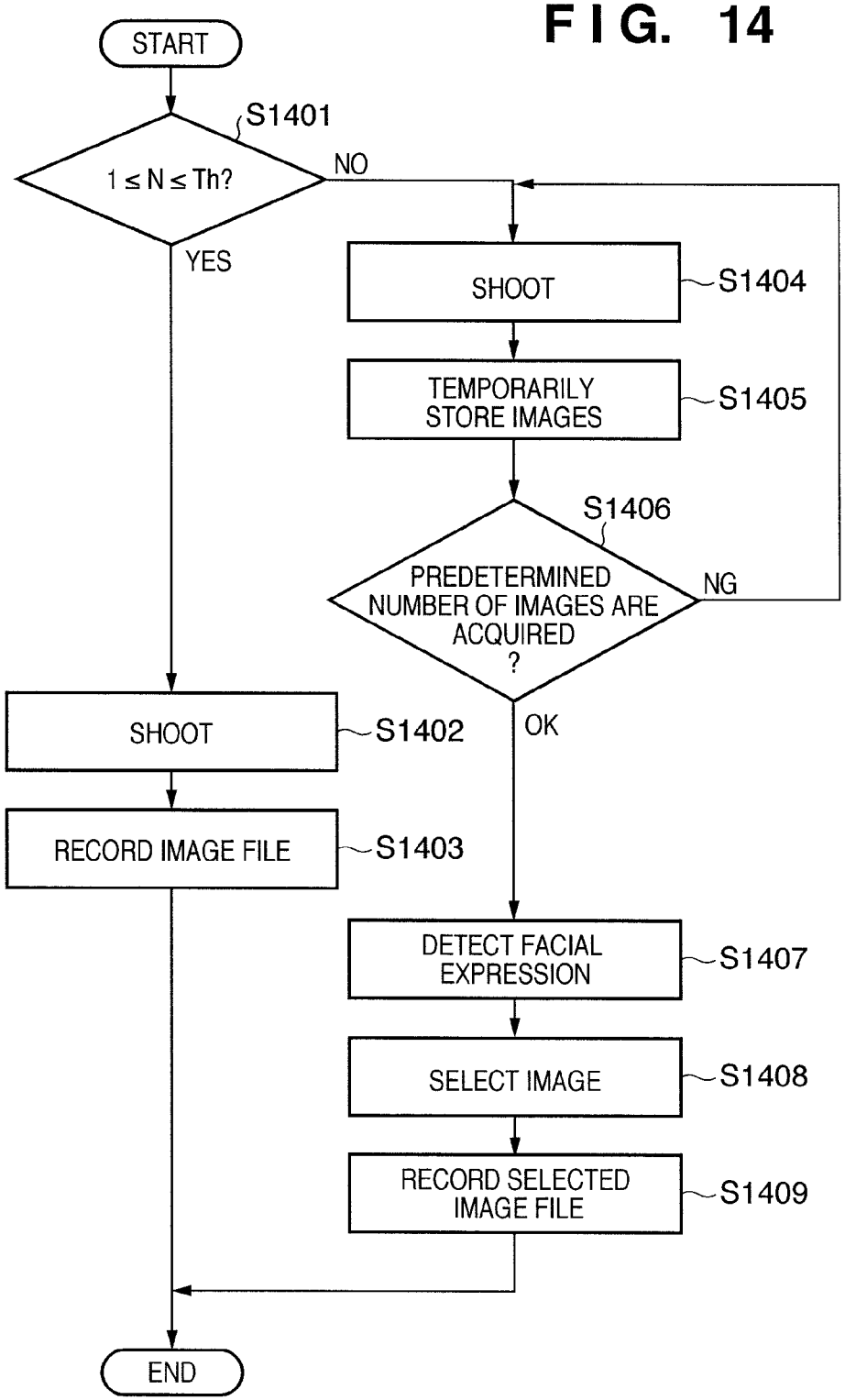
FIG. 14 is a flow chart illustrating a shooting process and a storage process in a third embodiment of the present invention.

FIG. 14 is a flow chart illustrating the shooting process and the storage process in the third embodiment of the present invention.

When an instruction to shoot is received from the facial expression detection unit 106, in S1401 the image capturing unit 102 checks the number of major subjects N. When $1 \leq N \leq Th$, as described with the first embodiment, a process of shooting an image for recording is carried out (S1402). Then, the generated image file is recorded into a recording medium by the recording unit 110 (S1403).

By contrast, when at S1401 Th<N, the image is captured multiple times in succession. Specifically, first, in S1404, the image capturing unit 102 carries out a single shooting process and generates an image file. At this time, the quality of the image to save is the same as the image for recording that is captured in S1402. Next, in S1405, the image file thus generated is temporarily stored in the storage unit 108. In S1406, the image capturing unit 102 determines whether the predetermined number of successive image captures is finished. The predetermined number of successively captured images is set at a value determined in advance through experience. The number of images captured in succession may be changed according to the value for the number of major subject persons N.

Once the predetermined number of successive image captures is finished, in S1407 detection of a predetermined facial expression by the facial expression detection unit 106 is carried out on the subjects contained in the group of images thus acquired. In the present embodiment, the predetermined facial expression is a smile.

Next, in S1408, the facial expression detection unit 106 selects from the successively captured group of images a best image as an image to save based on the results of the facial expression detection. Specifically, an image in which a number of faces determined to be smiling $N_{smile}$ is at its maximum, for example, is selected as the best images.

Next, in S1409, the recording unit 110 records into the recording medium only the image file selected by the facial expression detection unit 106.

At this time, the recording unit 110 deletes from the storage unit 108 image files other than the selected image file. The selected best image, as with the first embodiment, is displayed by the image display unit 109.

Thus, as described above, the present embodiment carries out automatic shooting using detection of the eyes of all the subjects being open as a trigger as described with the first embodiment when the number of major subjects is equal to or greater than a threshold, but successively captures a plurality of images at that time. Then, from among the plurality of images, a best image based on the facial expressions of the major subjects is selected. If an image in which the number of subjects smiling is greatest is selected as in the example described above, then, for example, even in a case in which the number of subjects is such that waiting for all the major subjects to have their eyes open and to be smiling before automatic shooting is not realistic, it is still possible to carry out automatic shooting of an image in which many subjects who have their eyes open and are smiling are included.

(Variation)

It should be noted that, in the present embodiment, the user may be allowed to carry out the process that selects from the successively captured group of images the image to actually record. At that time, the facial expression detection process performed in S1407 in FIG. 14 is not carried out. In other words, immediately after the end of S1406, processing moves to S1408. In S1408 the image display unit 109 displays a user interface for enabling the user to select an image and waits for input of a selection instruction from the user.

Figure 15:
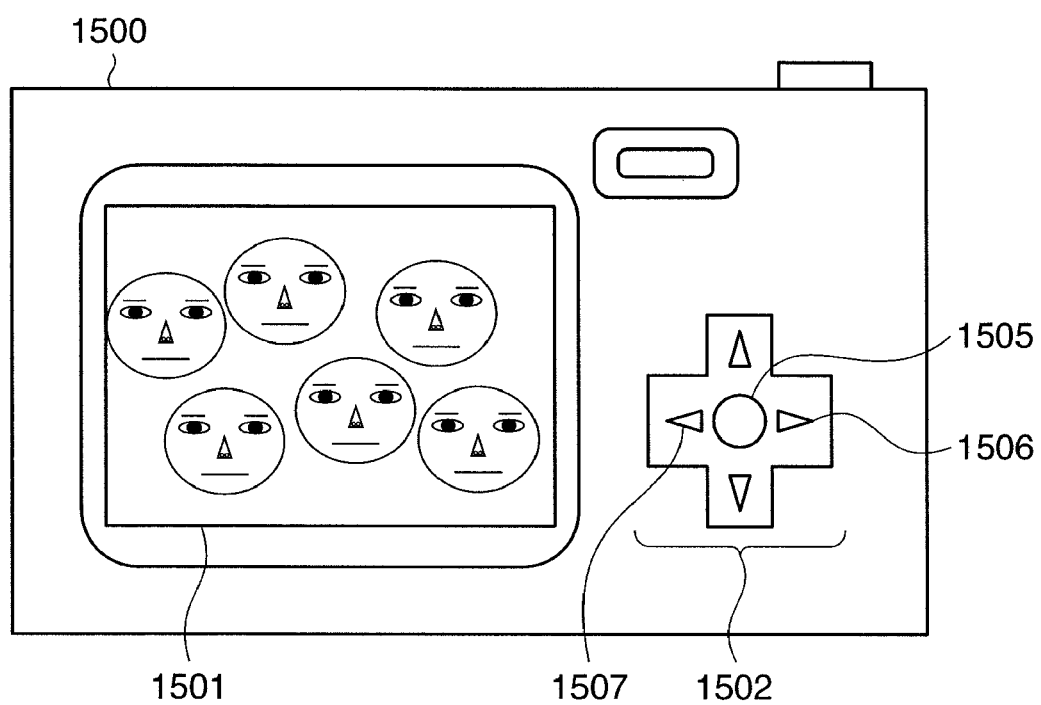
FIG. 15 is a diagram showing an example external view of a digital camera and an example of a user interface displayed in a variation of the third embodiment of the present invention.

FIG. 15 is a diagram showing an example external view of a digital camera and an example of a user interface displayed that the image display unit 109 displays in a variation of the present embodiment.

A display unit 1501 composed of an LCD or the like and a cursor unit 1502 for instructing cursor movement in a GUI are provided on a back surface of a digital camera 1500. The image display unit 109 causes the display unit 107 first to display images from the acquired group of images in chronological order from the oldest image when conducting the image selection process described above.

When the user presses a right cursor button 1506 of the cursor unit 1502, the image display unit 109 displays the next image captured after the image being displayed on the display unit 1501. When a left cursor button 1507 is pressed, the image captured after the image being displayed is displayed on the display unit 1501. Then, when a set button 1505 is pressed, the image being displayed is selected as the best image and recorded by the recording unit 110. As described above, the recording unit 110 deletes other groups of images from the storage unit 108 when recording.

Fourth Embodiment

Next, a description is given of a fourth embodiment of the present invention.

Whereas in the first embodiment the facial expression detection mode is changed according to the number of major subjects, in the fourth embodiment the facial expression detection mode is changed according to an elapsed time.

Specifically, in the fourth embodiment, a mode for comparatively severe conditions is set up to a predetermined elapsed time, and when automatic shooting cannot be carried out even after the predetermined elapsed time, that is, where the set conditions are not met, those conditions are relaxed. More specifically, a mode that detects both smiling and eyes being open simultaneously is set first, and if automatic shooting cannot be carried out even after the predetermined elapsed time, the setting is changed, for example, to a mode that detects only the eyes being open.

For example, when the present embodiment is applied to the first embodiment, the processes of S205 and thereafter shown in FIG. 2 become the processes shown in the flow chart shown in FIG. 16. However, unlike the first embodiment, in the present embodiment the mode that detects both smiling and eyes being open is set initially even when 1<N≦0. Alternatively, the processes of S203 and S204 shown in FIG. 2 may be omitted and the mode that detects both smiling and eyes being open may be set as an initial value regardless of the value of N.

In S1601, the facial expression detection unit 106, in accordance with the mode that detects both smiling and eyes being open, detects whether all the major subjects in the preview image have their eyes open and are smiling. At this time, a time at which facial expression detection begins is initially set at t=0.

In S1602, the facial expression detection unit 106 determines whether or not an appropriate image, in which all the major subjects have been found to have the desired facial expression, that is, have their eyes open and are smiling, is acquired. Here, if it is determined that all the major subjects have been found to have the desired facial expression, then as with the first embodiment an instruction to shoot is sent from the facial expression detection unit 106 to the image capturing unit 102 and the processes of S208-S210 are executed.

By contrast, if in S1602 the desired facial expression cannot be detected on one or more major subjects, then in S1603 the facial expression detection unit 106 determines an elapsed time. The facial expression detection unit 106 compares the elapsed time from the start of facial expression detection initially to a predetermined value, and determines if a predetermined time has elapsed. The predetermined value is a permitted time in which to attempt automatic shooting in the mode that detects both smiling and eyes being open, and is set in advance through experience. This fixed value may be dynamically changed according to the number of major subjects N. For example, the time may be lengthened as N increases.

In S1603, if the predetermined time has not elapsed, in S1605 another preview image is acquired by the image capturing unit 102. By contrast, if the predetermined time has elapsed, the facial expression detection unit 106 notifies the facial expression detection mode controller 105.

The facial expression detection mode controller 105, in response to this notification, changes the facial expression detection mode to something corresponding to more relaxed conditions (S1604), for example, from the mode that detects both smiling and eyes being open to a mode that detects only the eyes being open.

Thereafter, as with the first embodiment, the processes of S205 and thereafter are executed.

It should be noted that, where the processes of S205-S208 are repeated and even after the predetermined elapsed time it cannot be detected that all the major subjects are both smiling and have their eyes open, processing may be forcibly advanced to S208 regardless of the facial expression detection process results in S205 and automatic shooting carried out. Further, instead of using the elapsed time from the start of the facial expression detection process as the criteria for determining whether or not to change the facial expression detection mode, alternatively the number of times facial expression detection is carried out or the number of times the preview image is acquired may be used.

Moreover, although a description is given here only of an example in which the initial mode setting is relaxed in a single stage, alternatively the facial expression detection conditions may be relaxed sequentially in multiple stages. In addition, besides reducing the types of facial expressions that should be detected, such conditions may also be relaxed by reducing the number of major subject that should be detected to meet those conditions.

Thus, as described above, even in a case in which the major subject consists of multiple persons the present embodiment relaxes the conditions sequentially depending on circumstances after attempting to ascertain if the most ideal conditions cannot be met, thus making it possible to acquire the most ideal images possible while reducing the occurrence of situations in which automatic shooting is not carried out even after an extended period of time has elapsed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-039823 filed on Feb. 20, 2007, which is hereby incorporated by reference herein in its entirety.

What is claimed is:

1. An image processing apparatus comprising:
   a detection unit that detects a face from an image;
   a determination unit that determines a condition that is to be satisfied with respect to the detected face; and
   an identification unit that identifies whether or not the detected face is in a state that satisfies the condition,
   wherein the determination unit automatically changes the condition according to information relating to either the number of the detected face(s) or an orientation of each of the detected face(s).

2. The image processing apparatus according to claim 1, wherein the determination unit sets a condition that is to be satisfied by a plurality of the detected faces, and relaxes the condition that is to be satisfied by the plurality of detected faces as the number of subject(s) based on the detected face(s) increases.

3. The image processing apparatus according to claim 1, wherein the determination unit sets a condition individually for each detected face, and sets a condition for a face not facing full front that is more relaxed than a condition for a face facing full front.

4. The image processing apparatus according to claim 1, further comprising a selection unit and an image capturing unit that generates the image,
   wherein the image capturing unit captures a plurality of images continuously in a case in which the number of subject(s) based on the detected face(s) is greater than a predetermined number, and
   wherein the selection unit, based on state(s) of face(s) detected from each of the plurality of images obtained by the image capturing unit, selects one image from the plurality of images.

5. The image processing apparatus according to claim 4, wherein the selection unit selects from the plurality of images an image that includes the greatest number of detected faces that satisfy the condition.

6. The image processing apparatus according to claim 1, wherein the determination unit determines a condition that is to be satisfied by a plurality of the detected faces, and relaxes the condition in a case in which at least one of the plurality of the detected faces is not identified as satisfying the condition by the identification unit even after a predetermined time elapses.

7. The image processing apparatus according to claim 1, wherein the state that satisfies the condition is at least one of: eyes being open and a predetermined facial expression.

8. The image processing apparatus according to claim 1, further comprising an image capturing unit that generates the image,
   wherein an instruction to shoot is output to the image capturing unit in a case in which the identification unit identifies the detected face is in the state that satisfies the condition.

9. The image processing apparatus according to claim 1, further comprising a recording unit that records an image,
   wherein the detection unit detects a face from a frame image of a moving image, and
   wherein the recording unit, in a case in which the identification unit identifies the detected face is in the state that satisfies the condition, records the frame image in which the face being in the state that satisfies the condition is detected as an index file of the moving image.

10. A method for an image processing apparatus comprising:
    detecting a face from an image;
    determining a condition that is to be satisfied with respect to the detected face; and
    identifying whether or not the detected face is in a state that satisfies the condition,
    wherein the condition is automatically changed according to information relating to either the number of the detected face(s) or an orientation of each of the detected face(s).

* * * * *